(No Model.) 2 Sheets—Sheet 1.
H. W. LEONARD.
ELECTRICAL TRANSMISSION OF POWER.
No. 463,802. Patented Nov. 24, 1891.
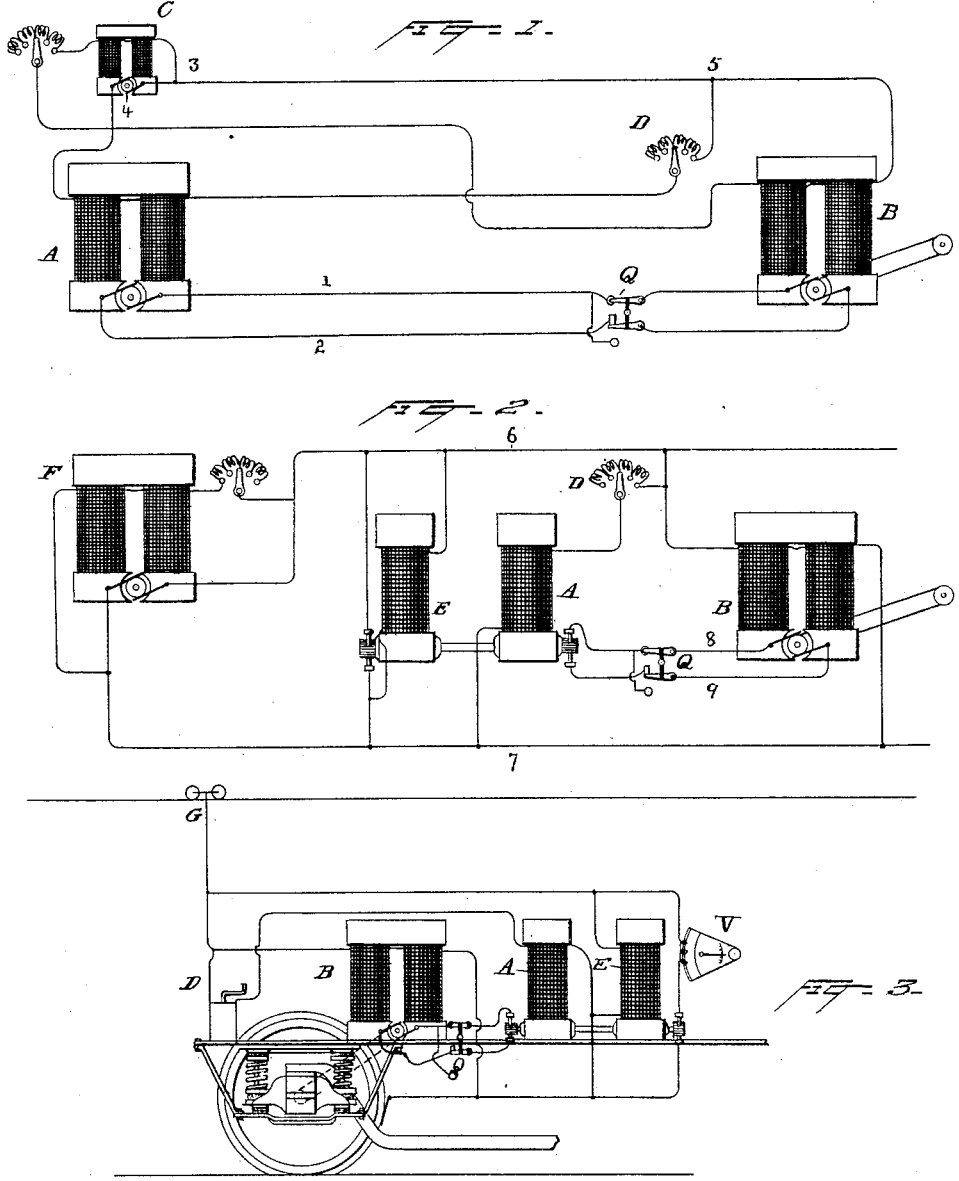
Witnesses
Norris G. Clark,
N. F. Oberlin
Inventor
H. Ward Leonard
By his Attorneys
Dyer & Seely (No Model.) 2 Sheets—Sheet 2.
H. W. LEONARD.
ELECTRICAL TRANSMISSION OF POWER.
No. 463,802. Patented Nov. 24, 1891.
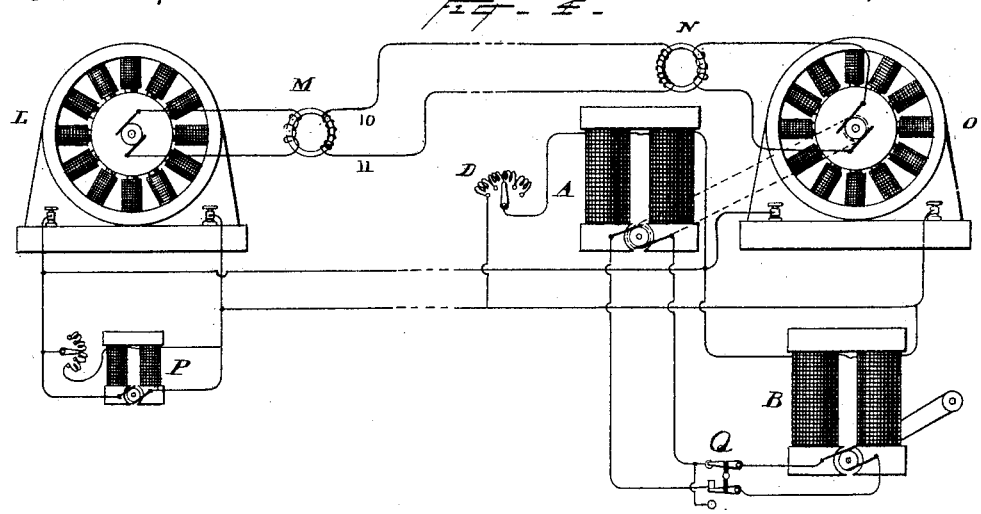
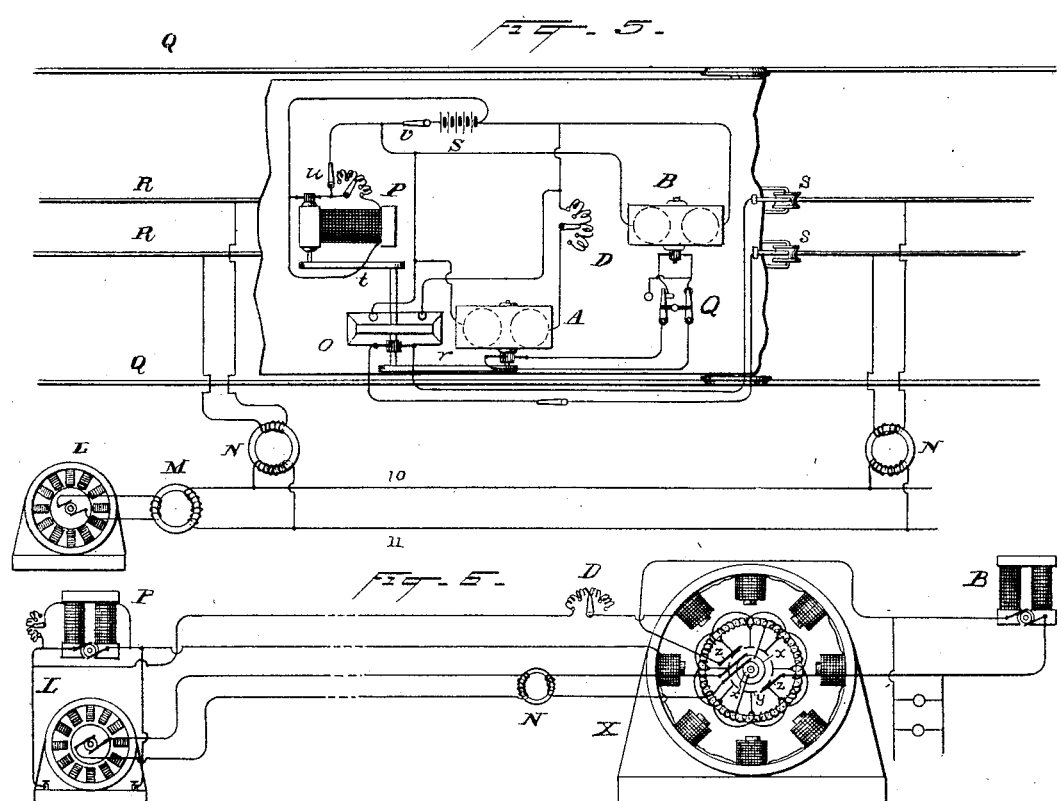
Witnesses
Norris G. Clark.
A. F. Oberlin.
Inventor
H. Ward Leonard
By his Attorneys
Dyer & Seely.

United States Patent Office.

HARRY WARD LEONARD, OF NEW YORK, N. Y.

ELECTRICAL TRANSMISSION OF POWER.

SPECIFICATION forming part of Letters Patent No. 463,802, dated November 24, 1891.

Application filed August 14, 1891. Serial No. 402,651. (No model.) Patented in England August 27, 1891, No. 14,509.

*To all whom it may concern:*

Be it known that I, HARRY WARD LEONARD, a citizen of the United States, residing at New York, county and State of New York, have invented a certain new and useful Improvement in Electrical Transmission of Power, (for which I have received Letters Patent in Great Britain, No. 14,509, dated August 27, 1891,) of which the following is a specification.

My invention relates, mainly, to the use of electric motors for performing mechanical operations, and especially to the use of motors for purposes in which it is necessary to run at different speeds and at the same time maintain a constant torque, and also where it is necessary to change both the torque and the speed of the motor.

The main object of my invention is to enable an electric motor to be run at different speeds, and also with different torques, and to enable the speed to be changed with practically no variation of the torque, and also to keep the work done by the motor constant under variations in the speed and torque required. In the use of motors for electric railways, for example, it is often desirable that the armature should exert a stronger torque or greater pull—as, for instance, where it is desired to run with a heavier load or ascend a grade—and it is also sometimes desirable to alter the speed without varying the torque, so that a car may be slowed down without detracting from the rotary effort of its motor. With such electric motors as have heretofore been employed the arrangements for changing the speed have been such as to produce a variation in the field strength, which has resulted in varying the torque, the torque being dependent on two factors—namely, strength of field and amperes of current in armature. By my invention I am enabled to vary the speed without affecting the strength of the field-magnet or the current traversing the armature-coils, and therefore without changing the torque, and also without materially altering the non-sparking points on the commutator.

The main feature of my invention consists in energizing the field-magnet of the motor by a constant source of current separate from the source which supplies the armature and regulating the speed of the motor by varying the electro-motive force of the source of current which supplies the motor-armature. With a motor so arranged, if the load is increased there is a tendency to slowing down of the armature, which results in a tendency to a decrease of counter electro-motive force of the motor, which causes a greater number of ampères of current to flow through the motor-armature and increases the torque or pull on the armature so as to enable it to overcome the increased load without altering its speed but slightly; and, on the other hand, if it is desired to have the motor run at an increased speed the electro-motive force of the source of supplying current for the armature is raised, so that the voltage of the armature-supplying current is increased and the armature runs faster, though as this action increases its counter electro-motive force there is no increase in the ampères traversing its armature, and consequently no increase in the torque. To explain this in a different way, it may be said that, measuring the power exerted by an electric motor in foot-pounds per second, the time element represents the speed of the motor and the weight element the pull or torque. Each of these elements corresponds to one of the electrical conditions of the armature-supplying circuit as I arrange it—that is to say, the speed is dependent on the volts on the circuit and the pull or torque on the ampères, and by my invention I vary the ampères alone in order to change the torque, or I vary the volts alone in order to change the speed.

By another feature of my invention I am enabled to vary both the speed and torque in any reciprocal relation desired without varying the power drawn from the main source of supply, and I accomplish this by connecting the armature of the working motor with an intermediate generator whose potential is capable of being varied, which generator is run by a motor supplied by the main source. The field of the working motor is preferably supplied from the main source, as are also the fields of the intermediate motor and generator. Then if the element of "pounds pull" in the foot-pounds of the work being done by the motor is varied I vary the speed inversely as this variation in torque or pull by varying the volts supplied to the motor-armature inversely as the variation in the armature-current resultant upon such altered pull, so that the energy supplied to the motor and represented by the product of the volts and ampères and the energy produced by the motor and represented by the product of the speed and the pull remain constant. Hence to allow for the varying conditions required of the working motor variations are made only in the conditions of the circuit extending from the intermediate generator to the working motor, and practically the same power is drawn from the main source of supply. In applying this feature of my invention to electric railways I place the intermediate motor and generator, as well as the working motor, on the car, and cause the traveling contact with the line to supply the intermediate-motor armature by a multiple-arc branch circuit and the fields of all three of the machines, the field of the intermediate generator being variable without affecting either of the other machines. Thus when a number of cars are running upon the railroad, all in connection with the same supplying-line, each one is regulated within itself without affecting any of the others and always drawing the same current from the line—that is, the operator will regulate the electro-motive force of the intermediate generator so as to keep a constant current flowing from the line to the intermediate motor, and whenever the working motor requires a change of current on account of a change in the pull, due to a grade or a curve or to an increased weight, the speed of the car will automatically adjust itself to that necessary to keep the work done by the motor constant.

At present it is necessary in electric railways to provide at the generating-point an amount of power largely in excess of that which is required to normally run all the cars in consequence of the great amount of pull which is required in going around curves and up grades; but since by my invention no more energy is required from the line in these cases than at other times, because of the reduction of speed, as already set forth, the current required by the working motor to give it the necessary torque being given by increasing the ampères on the circuit from the intermediate generator with corresponding reduction in the volts, the power-plant may be largely reduced from what is required at present and the prime power, either water-power or steam-power, much more easily governed and the operation of the generator much simplified, because of the nearly-constant load, the current on the line being maintained at a suitable average.

My invention also includes the use of alternating currents for supplying continuous-current motors through the medium of an alternating-current motor running an intermediate generator. Since the speed of this alternating-current motor never has to be changed, any suitable form of alternating-current dynamo-machine may be used for the purpose.

My invention may be better understood by reference to the accompanying drawings, in which—

Figure 1 is a diagram of an arrangement for a stationary motor embodying a simple form of my invention; Fig. 2, a diagram showing the arrangement of the stationary motor supplied by an intermediate variable generator; Fig. 3, a diagram showing the same arrangement applied to an electric-railway car; Fig. 4, a diagram showing the use of alternating currents in connection with a stationary motor; Fig. 5, a diagram illustrating the alternating-current arrangement in connection with an electric railway; and Fig. 6 is a diagram illustrating an alternating-current system in which the intermediate generator and motor are combined into a single machine.

Referring first to Fig. 1, A is a suitable dynamo-electric machine, and 1 2 is a circuit extending from its armature and including the armature of an electric motor B, which may be considered as one intended to do work which requires it to run at different speeds and also with different torques while performing either a constant work or a variable work. C is a constant-potential dynamo, whose circuit 3 4 includes the field-magnet of motor B, whereby the said field-magnet is maintained at a constant strength. A multiple-arc branch 4 5 from the circuit 3 4 includes the field-magnet of the generator A, although, if desired, the magnet of the generator may be energized from another exciting-machine or from the circuit of the generator itself. In any case, however, I prefer to have the field-circuit of the generator A extend into proximity with the motor B or the point where its work is to be performed, and at the location of said motor or work I provide an adjustable resistance D or other means for regulating the potential of the generator A. The resistance D is used to vary the speed of the motor B by varying the electro-motive force of the generator A, and since this is done without affecting the field-magnet of the motor B it is accomplished when the pull element of the work is constant without any change in the torque of the motor, so that it runs with the same torque, although at different speed. When the pull element of the work does vary, the current required to produce the necessary torque to take care of the altered pull will automatically flow and the speed will remain practically the same. Since the armature of the motor B is always in a strong and constant magnetic field, the neutral point on the commutator is kept constant even if the work varies, provided the torque is kept constant, and even when the torque varies the distortion of the neutral point is very slight, and therefore there is no detrimental sparking at the commutator-brushes even in reversing the rotation of the armature, and it will further be seen that the efficiency of the apparatus is practically the same at low speed as at full speed. Q is a circuit-controller and reverser by which the working motor B may be started, stopped, and reversed.

Referring now to Fig. 2, the working motor B has its armature connected in circuit with the armature of the generator A, whose armature is placed on the same shaft with or otherwise geared to the armature of an intermediate motor E, this being a shunt-wound motor whose field and armature are both supplied from the main circuit 6 7, extending from the armature-terminals of a constant-potential generator F, which forms the main source of supply. The field-magnet of the working motor B and that of the intermediate generator A are each supplied by a multiple-arc circuit from the main line 6 7, the field-circuit of the intermediate generator A having included in it an adjustable resistance D, or the magnet being provided with other suitable means for varying its strength, so as to change the electro-motive force of the machine. It will be seen that in this case, as in the one previously described, the working motor B has its field supplied from a separate source from that which supplies its armature, and the field-magnet is therefore kept at a constant strength independent of any changes which occur in the conditions of the armature-circuit. If it is desired to change the speed of the motor B without varying its torque—that is, when the pull of the load is not changed—the resistance D is adjusted so as to increase the strength of the field-magnet of the intermediate generator A and raise the electro-motive force of said generator, whereby the voltage of the circuit 8 9 is raised and the armature of the motor B is made to run at an increased speed; but there being no change in the ampères flowing in the motor-armature, because the counter electro-motive force will increase in proportion to the speed, and no change in the strength of the motor field-magnet the torque of the motor remains the same as before. When the pull element of the load on the motor is increased, the tendency to decline in speed causes the ampères on the circuit 8 9 to increase, and the torque of the motor is therefore raised, so that the motor runs under the increased pull at practically the same speed as before. It will be seen that the motor can be operated at a constant speed, the rate of such speed being variable at will, and at any one speed it will supply automatically the necessary torque for the load.

For an illustration, suppose the working motor B to have an armature with a capacity to stand two hundred ampères and a field-magnet wound for and excited by five hundred volts. The intermediate-motor armature will stand forty ampères and the intermediate generator armature two hundred ampères, the fields of the intermediate motor and generator being wound for and excited by five hundred volts each. Suppose, also, that to operate at full speed with an average load the working motor requires for its armature five hundred volts and forty ampères. In this case the intermediate generator A is operated with its strongest field, so that it supplies the working motor with the required five hundred volts and forty ampères, it being understood that for simplicity of explanation the losses in conversion are disregarded. Now if the load is increased to an extent requiring five times the pull which was required before this will involve having five times the torque, which requires five times the current in the armature, the field of the motor remaining the same. In consequence of the increased torque of the motor the generator supplies two hundred ampères to its armature, and in order to keep the power constant the field of the generator A is weakened so as to reduce the potential to one hundred volts. The motor will now run at one-fifth of its full speed, and its torque or pull will be five times as great as before; but the power supplied by the main line 6 7 will be no greater than before. It will be seen that by this arrangement a number of motors may be operated on the same line, each under varying conditions of pull and speed and the same current maintained on the line 6 7, so that the generating-plant at F may be made much smaller than has heretofore been necessary, because of the increased power called for by increased loads.

Fig. 3 shows the arrangement of Fig. 2 applied to a car. The drawings show a portion of the car with the working motor B geared to the driving-axle, the intermediate generator A mounted on the car and connected with the armature of the motor B, and the intermediate motor E also on the car and having its armature-shaft connected with the armature-shaft of the generator A. One traveling contact is shown at G, the other being formed by the car-wheels, as shown. The fields of the three machines are all shown as connected in multiple arc with the line, the armature of the intermediate motor E being also in a multiple-arc branch, and the field-circuit of the generator A being provided with a resistance-box D. The operation is the same as described with reference to Fig. 2, and it will be seen that by the use of this arrangement the street-car can, if desired, be propelled up grades or around curves without requiring any more current from the line than is necessary on a level straight track, the speed of the propelling-motor being varied at will by the regulation of the generator A and the torque being automatically determined by the pull of the load. Preferably the current on the circuit 6 7 is, as stated, of much higher potential than that on circuit 8 9, the motor E and generator A being, as described, constructed to reduce the tension of the current. An ampère meter V is shown to enable the operator to observe the current taken from the line by the motor E. For the transmission of current to a great distance the use of alternating currents is desirable, so that a high electro-motive force or tension can be obtained without the necessity of conveying such high-tension currents through moving parts or contacts, and because such currents can be converted or transformed by devices having no moving parts. On the other hand, in order to enable a motor to run efficiently with variable speed and variable torque it is necessary to employ continuous currents. I provide for this in connection with my invention by the arrangement shown in Fig. 4, which shows this feature in connection with stationary motor apparatus. L is an alternating-current generator situated at the source of power, and M is a tension-raising converter at the station, by means of which a current of very high potential is delivered to the line 10 11, which is supposed to extend a considerable distance from the generator L. At any point where it is desired to do work I place a tension-reducing converter N to reduce the tension of the current to the desired point, the secondary of said converter being connected to the armature-circuit of an alternating-current motor O, which, as its speed is never changed, may be any efficient type of alternating-current machine running synchronously with the generator L. I employ the alternating-current motor O to operate the continuous-current generator A, the armature of the generator A being in circuit with the armature of the working motor B. P is a continuous-current exciter, which is used to excite the field of the main generator L, that of the alternating-current motor O, that of the continuous-current generator A, and that of the working motor B, all these field-circuits, as well as that of the exciting-machine itself, being in multiple arc to each other. The multiple-arc circuit, which includes the field-magnet coils of the continuous-current generator A, is provided with an adjustable resistance D, or other suitable means may be employed for regulating the strength of the field-magnet. The method of altering the speed and torque of the generator B is the same, as has already been described with reference to Figs. 2 and 3. The variations of work done by the intermediate motor B may be made so gradual as not to affect the synchronous operation of the alternating-current motor O.

Fig. 5 shows the alternating-current arrangement applied to a railway-car, a portion of the car being shown in the drawings in plan view running upon rails Q Q. The circuit 10 11 extends from the secondary of the tension-raising converter M, supplied by the alternating-current dynamo L, as before. The primaries of the tension-reducing converters N N are connected in multiple arc with the circuit 10 11, the secondaries of these converters, which have a current of lower tension, being connected with the working conductors R R of the railway, which working conductors may be the traffic-rails themselves or of any other suitable character, current being taken from them by traveling contacts s s, or by the car-wheels if the rails form the conductors. To avoid the necessity of using the converters with their secondaries in multiple arc, the working conductors R R may be divided into sections in any suitable manner, so that a car running on the railway will receive the current of only a single converter at one time. Upon the car is shown the alternating-current motor O, connected directly with the traveling contacts s s and having its armature-shaft joined by a belt $r$ with the armature-shaft of the continuous-current generator A, whose armature-circuit extends to the armature of the motor B, which is suitably connected with the running-gear of the car to propel the same. The exciter P is preferably placed on the car in this case and connected by a belt $t$ with the shaft of the alternating-current motor O. The armature of the exciting-generator P is connected with the field-magnets of the generator A and motors B and O, these field-magnets being all in multiple arc to each other. In order to start the apparatus in case the motor O is of a type that is not able to start itself under conditions of no load, I prefer to provide a storage-battery S, connected so as to be charged by the exciter P, and so that by opening the switch $u$ and closing the switch $v$ the battery may be used to excite all the fields until the car is under way, when the switch $u$ may be closed and the switch $v$ opened and the field excited by the dynamo P; or in order to start the alternating-current motor gradually the dynamo P may be run as a motor by the storage-battery until the synchronizing speed is reached, and the alternating-current motor will then be connected with the line.

I have shown in Figs. 4 and 5 an alternating-current motor connected mechanically with a continuous-current generator, the two machines being separate ones. I may, however, employ a transformer in which an alternating current is supplied to the primary and a continuous current is produced in the secondary, the latter being capable of having its electro-motive force varied, so that the device is in all respects suitable to be substituted for the separate motor and generator hereinbefore described. By this arrangement I combine the intermediate generator and motor into a single machine. Such an arrangement is illustrated in Fig. 6, a form of transformer which I may employ being shown mainly in diagram.

The source of alternating current supplies, through the tension-reducing converter N, the motor-coils of the rotating transformer X, which coils are connected with rings $x\ x$ on the armature-shaft, so that the armature is revolved synchronously with that of the supplying-generator. The transformer-armature has also upon it a continuous winding, which is connected at intervals with the segments of a commutator $y$. In practice the number of segments and connections thereto will of course be much greater than is shown in the drawings, which are intended merely for illustration. The brushes $z\ z$ take off a continuous current from the commutator $y$, which is supplied to the working motor B or to other translating devices, as shown.

The exciting-machine P supplies a continuous current to the field-magnets of the transformer, and in the circuit thereof is the adjustable resistance D, or other suitable means are provided for varying the electro-motive force of the exciting-machine. The alteration of the strength of the field-magnet of the transformer, produced by such variation of the electro-motive force supplied thereto, does not affect the speed of the revolution of the armature produced by the alternating current, but does affect the generation of the continuous secondary current, and so varies the electro-motive force supplied to the working motor or other translating device.

I do not claim herein specifically the transformer just described, by the use of which the intermediate motor and generator are combined into a single machine, since I intend to make this arrangement the subject of another application.

It is to be understood that in referring in this specification to "alternating" currents I do not intend to confine myself to currents whose alternate phases are opposite in direction, but to include all pulsating and intermittent currents, and all other currents of a character adapted to produce other currents by induction.

What I claim is—

1. The method of operating and regulating an electric motor, consisting in maintaining the strength of its field-magnet and the position of its commutator-brushes constant and altering its speed by varying the electro-motive force supplied to its armature, substantially as set forth.

2. The method of operating and regulating an electric motor, consisting in maintaining the strength of its field-magnet constant and altering its speed by varying the electro-motive force of the supplying-generator, substantially as set forth.

3. The method of operating and regulating an electric motor, consisting in maintaining the field-magnet of the motor at a constant strength, varying the volts on the armature-circuit to change the speed, and varying the ampères on the armature-circuit to change the torque, substantially as set forth.

4. The method of performing work by an electric motor, which consists in supplying thereto an electro-motive force varying approximately proportionally to the speed desired without materially varying the current and a current approximately proportional to the torque desired without materially varying the electro-motive force, substantially as set forth.

5. The method of performing work by the use of electric energy, which consists in varying the electro-motive force in proportion to the "foot" element of the foot-pounds per second of the power required and varying the current in proportion to the "pounds" element, substantially as set forth.

6. The method of performing work by an electric motor under conditions of varying speed, which consists in supplying thereto an electro-motive force approximately proportional to the speed desired and a current approximately proportional to the torque desired, substantially as set forth.

7. The method of performing work by the use of electric energy under conditions of varying speed, which consists in varying the electro-motive force in proportion to the foot element of the foot-pounds per second of the power required and varying the current in proportion to the pounds element, substantially as forth.

8. The combination of an electro-dynamic motor, a source of supply for its armature, a separate constant source of supply for its field-magnet, and means for varying the potential of the armature-supplying source, located at the point of work performed, substantially as set forth.

9. The combination of an electric motor, a generator for supplying its armature, a separate generator for exciting its field-magnet, and a resistance in the field-circuit of the armature-supplying generator, located at the point of work performed, substantially as set forth.

10. The combination of a working motor, a main source of supply, an intermediate motor connected with said main source, an intermediate generator driven by said intermediate motor and provided with means for varying its electro-motive force, a circuit extending from the said intermediate generator to the armature of the working motor, and a circuit independent thereof for energizing the field-magnet of said working motor, substantially as set forth.

11. The combination of the main source of supply, the intermediate motor having its field-magnet and armature both connected therewith, the intermediate generator run by the said motor and having its field-magnet supplied by the said main source and provided with means for varying its strength, and a working motor having its field-magnet supplied from the said main source and its armature supplied from the said intermediate generator, substantially as set forth.

12. The combination, with a wheeled vehicle, of an electric motor mounted thereon to propel the same, said motor having its armature and field-magnet energized by separate circuits, and means on the vehicle for varying the electro-motive force of the energy supplied to the armature of said motor, substantially as set forth.

13. The combination, with a vehicle, of a supplying-line, an electric motor mounted on the vehicle and propelling the same, a generator on the vehicle supplying the armature of said motor and provided with means for varying its electro-motive force, the field-magnet of said motor being separately excited, and another motor on the vehicle connected with the said supplying-line and having its armature mechanically connected with the armature of the said generator, substantially as set forth.

14. The combination of a vehicle, a supplying-line, a propelling-motor, an intermediate generator, and an intermediate motor on the vehicle, the armature and field-magnet of the intermediate motor, the field-magnet of the intermediate generator, and the field-magnet of the propelling-motor being all connected with the supplying-line, the circuit of the field-magnet of the said generator being provided with an adjustable resistance, substantially as set forth.

15. The combination of a source of alternating current, an alternating-current motor connected therewith, a continuous-current generator run by said motor, and a working motor having its armature supplied by the said continuous-current generator and its field supplied from a separate source, the said continuous-current generator being provided with means for varying its potential, substantially as set forth.

16. The combination of a source of alternating current, an alternating-current motor connected therewith, a continuous-current generator run by the said motor, a working motor having its armature supplied by the said generator, and an exciting-machine for energizing the fields of the said continuous-current generator and working motor, the field-circuit of the said generator having an adjustable resistance, substantially as set forth.

17. The combination of a source of alternating current of high tension, a tension-reducing converter connected therewith, an alternating-current motor in the secondary circuit of said converter, a continuous-current generator operated by the said alternating-current motor, and a working motor having its armature supplied by the said generator and its field supplied by a separate source, the electro-motive force of the said continuous-current generator being variable, substantially as set forth.

18. The combination, in an electric railway, of a source of alternating current of high tension, tension-reducing converters connected at intervals with the high-tension circuit and having their secondary coils connected with the working conductors of the railway, a car on said railway having upon it an alternating-current motor connected with the said working conductors, a continuous-current generator run by the said motor, and a propelling-motor for the car, having its armature supplied by the said generator and its field energized from a separate source, the electro-motive force of the said continuous-current generator being adjustable, substantially as set forth.

19. The combination, in an electric railway, of a source of alternating currents of high tension, converters having their primary circuits connected at intervals with the high-tension circuit and their secondary circuits connected with the working conductors of the railway and the car on said railway having upon it an alternating-current motor connected with the said working conductors, a continuous-current generator run by the said motor, a propelling-motor for the car, having its armature supplied by the said generator, and an exciting-dynamo also run by the said alternating-current motor and with which the field-magnets of the motors and generator of the car are connected in multiple arc, the field-circuit of the said generator being provided with means for varying its strength, substantially as set forth.

20. The combination, in an electric railway, of a source of alternating current of high tension, converters having their primary circuits connected at intervals with the high-tension circuit and their secondary circuits connected with the working conductors of the railway, a car on said railway having upon it an alternating-current motor connected with the said working conductors, a continuous-current generator run by the said motor, a propelling-motor for the car, having its armature supplied by the said generator, an exciting-dynamo also run by the said alternating-current motor, a storage-battery, and switches whereby the fields of the motors and generator on the car may be connected with the exciting-dynamo and the storage-battery alternately, substantially as set forth.

21. The combination of a source of alternating current, an alternating-current motor connected therewith, a continuous-current generator operated by said motor and having its field-magnet separately excited, and a translating device supplied by said generator, substantially as set forth.

22. The combination of a source of alternating current of high tension, a tension-reducing converter having its primary circuit connected with said source, an alternating-current motor supplied by the secondary-circuit of said converter, a continuous-current generator operated by said motor and having its field-magnet separately excited, and a translating device supplied by said generator, substantially as set forth.

23. The combination of a source of alternating current of high tension, a tension-reducing converter having its primary circuit connected with said source, an alternating-current motor supplied by the secondary circuit of said converter, a continuous-current generator operated by said motor, and a working motor having its armature supplied by said generator and its field-magnet separately excited, substantially as set forth.

24. The combination of a source of alternating current of high tension, means for converting such current into a continuous current of lower tension, and a motor having its armature supplied by such continuous current and its field-magnet separately excited, substantially as set forth.

25. The method of keeping fixed the neutral point in the armature of an electric motor performing variable work, which consists in keeping the strength of the field of such motor constant and varying the electro-motive force supplied to the motor-armature to vary the speed, substantially as set forth.

26. The method of transforming the energy of a prime motor at any speed into propelling energy at any desired speed, which consists in operating an electrical generator by said prime motor, supplying the armature of an electric motor running in a constant field from said generator, and varying the electro-motive force of said generator to vary the speed of said electric motor, substantially as set forth.

This specification signed and witnessed this 11th day of August, 1891.

H. WARD LEONARD.

Witnesses:
   J. A. YOUNG,
   EUGENE CONRAN.